US005533932A

United States Patent [19]
Covington et al.

[11] Patent Number: 5,533,932
[45] Date of Patent: Jul. 9, 1996

[54] METHOD AND APPARATUS FOR COMPACTING COTTON WITHIN BASKET

[75] Inventors: Michael J. Covington, LaGrange; Kevin S. Richman, Darien, both of Ill.

[73] Assignee: Case Corporation, Racine, Wis.

[21] Appl. No.: 394,137

[22] Filed: Feb. 24, 1995

[51] Int. Cl.⁶ .................................................. A01D 46/08
[52] U.S. Cl. .................................................. 460/119; 56/28
[58] Field of Search ............................... 460/119, 114, 460/115; 56/28

[56] References Cited

U.S. PATENT DOCUMENTS

| | | | |
|---|---|---|---|
| 4,553,378 | 11/1985 | Fachini et al. | 56/16.6 |
| 4,744,207 | 5/1988 | Hanley et al. | 56/16.6 |
| 4,888,940 | 12/1989 | Deutsch | 56/28 X |
| 4,930,297 | 6/1990 | Schlueter et al. | 56/28 |
| 4,958,756 | 9/1990 | Conway | 56/28 X |

OTHER PUBLICATIONS

2155 Cotton Picker Operators Manual Rac 9–26020, pp. 1, 72 and 73, Jan., 1995, ©Case Corporation.

*Primary Examiner*—Terry Lee Melius
*Attorney, Agent, or Firm*—Rudnick & Wolfe

[57] ABSTRACT

A cotton compacting structure arranged in combination with a cotton receiving basket on a cotton harvester for compacting the relatively light and fluffy cotton materials directed and blown into the basket to increase the maximum capacity of the basket without increasing basket size. The compacting structure of the present invention includes a rigid frame assembly mounted for movement within the basket. One or more rotatable members are mounted on and for movement with the frame assembly for forcibly imparting direction to the cotton received in the basket. A method of filling a cotton basket assembly is also disclosed.

29 Claims, 3 Drawing Sheets

METHOD AND APPARATUS FOR COMPACTING COTTON WITHIN BASKET

FIELD OF THE INVENTION

The present invention generally relates to cotton harvesters and, more particularly, to compacting structure arranged within a cotton receiving basket to increase basket capacity without increasing basket size. A method of filling a basket of a cotton harvester is also disclosed.

BACKGROUND OF THE INVENTION

Cotton harvesters typically include a series of harvesting row units mounted at a front forward end of the cotton harvester for harvesting cotton from the plants as the harvester is driven across the field. To increase harvesting capacity, additional row units have been added across the front of the harvester.

Modern high capacity cotton harvesters are typically very large structures and include a high volume basket. Although the baskets of modern cotton harvesters have been increased, such increases in basket size have been offset by the supplementation of additional harvesting row units across the front of the harvester. Thus, the increased size basket on harvester still requires frequent emptying or dumping during a harvesting operation.

Dumping of cotton materials from the basket is a time consuming task that steals away from cotton harvesting operations. Still further increases to the size of the basket does not appear to be an available option to solve this problem. Further increases to the basket size are likely to adversely effect the transportability of the harvester across roads and fields. Also, and as will be appreciated, sized openings in barns, buildings and the like through which the harvester is driven limit further increases to the basket size.

Thus, there remains a need and desire for an improved method and apparatus for filling a cotton receiving basket to increase the total capacity thereof without increasing the size of the basket.

SUMMARY OF THE INVENTION

In view of the above, and in accordance with the present invention, there is provided a cotton compacting structure arranged in combination with a cotton receiving basket. The compacting structure of the present invention compacts the relatively light and fluffy cotton materials directed and blown into the basket to increase the maximum capacity of the basket without increasing basket size. The compacting structure of the present invention includes a rigid cotton compacting frame assembly mounted for movement within the basket. One or more rotatable members are mounted on and for movement with the frame. Upon rotation, each member is configured to forcibly impart direction to the cotton received in the basket.

In the illustrated embodiment of the invention, the basket is arranged on a frame of a cotton harvester that includes air duct structure for blowing harvested cotton materials into the basket in a predetermined direction. The basket is preferably configured with a bottom floor structure, a top wall, and rigid walls that extend upwardly from the bottom floor and are rigidly joined to the top wall. In a most preferred form of the invention, the basket is comprised of lower and upper basket portions. The upper basket portion is telescopically received for vertical movement relative to the lower basket portion thereby increasing the capacity of the basket.

The cotton compacting frame assembly of the compacting structure is movable between a retracted position and an extended position. In a retracted position, the frame assembly of the compacting structure is arranged generally parallel to and adjacent the top wall of the basket. In such position, the axis of the rotatable members extend generally parallel to the predetermined direction in which the cotton is blown into the basket. The cotton compacting frame assembly preferably includes a series of elongated rigid frame members which arranged on opposite sides of the rotatable members and which are joined to each other by transversely extending rigid members.

In a preferred form of the invention, the compacting structure further includes structure for pivotally connecting the frame assembly to the basket for pivotal movement about a generally horizontal axis. In a most preferred form of the invention, the frame assembly is mounted for pivotal movement about an axis arranged toward a rear of the basket. A driver is provided for moving the frame assembly along with the rotatable members carried thereon between the retracted position and toward an extended position. The driver for moving the compacting structure preferably includes a linearly distendable hydraulic cylinder which moves the compacting structure in response to selective actuation of a switch arranged in a cab region of the harvester. The switch controls cycle vertical movement of compacting structure within the basket.

The rotatable members of the compacting structure are preferably configured as elongated augers. Each auger on the compacting structure is individually driven by a motor. Preferably, a hydraulic motor serves to impart rotation to the augers independent of the vertical movement of the frame assembly. Selective control of the hydraulic motors used to rotate the augers is provided through a manually operated switch located in the cab region of the harvester. By such construction, the rotatable members can be driven independently of and concurrently with vertical movement of the frame assembly of the compacting structure.

The present invention further discloses a method of filling a cotton basket on a cotton harvester. The method includes the steps of blowing harvested cotton material in a pre-selected direction into the basket, rotating a series of augers to move the cotton in generally the same direction as the pre-selected direction; and moving a cotton compacting frame assembly on which the augers are mounted between a retracted position and an extended position to compact the harvested cotton materials in the basket. The method may further include the step of mounting the frame assembly for pivotal movement about a fixed generally horizontal axis. The enhanced method according to the present invention also preferably includes the step of rotating the augers independently from the step of moving the frame assembly.

The compacting structure of the present invention provides several benefits. With the compacting structure arranged in a retracted position, rotation of the augers impels cotton materials directed into the basket away from the outlet opening of the duct structure thereby providing an unobstructed path for the introduction of further cotton materials into the basket. When so desired, the compacting structure can be moved to compact cotton materials in the basket thereby increasing the maximum capacity of the basket. As the frame assembly moves downwardly, the frame members combine with the augers to compact the cotton materials toward the floor and away from the outlet opening of the duct structure. Also, as the augers move with the cotton compacting frame they continue to rotate. The rotating action of the augers tends to push the compacted cotton toward the rear wall of the basket away from the outlet opening in the duct structure. Since the compacting action on the cotton materials increases the basket capacity, the frequency of dumping is reduced, and, thus, the productivity of the harvester is significantly enhanced. Tests have indicated that a compacting structure according to the present invention, increases cotton capacity of a basket by approximately 45%.

Numerous other features and advantages of the present invention will become apparent from the following description of the drawings, the detailed description, and the appended claims.

DETAILED DESCRIPTION OF THE PRESENT INVENTION

Figure 1:
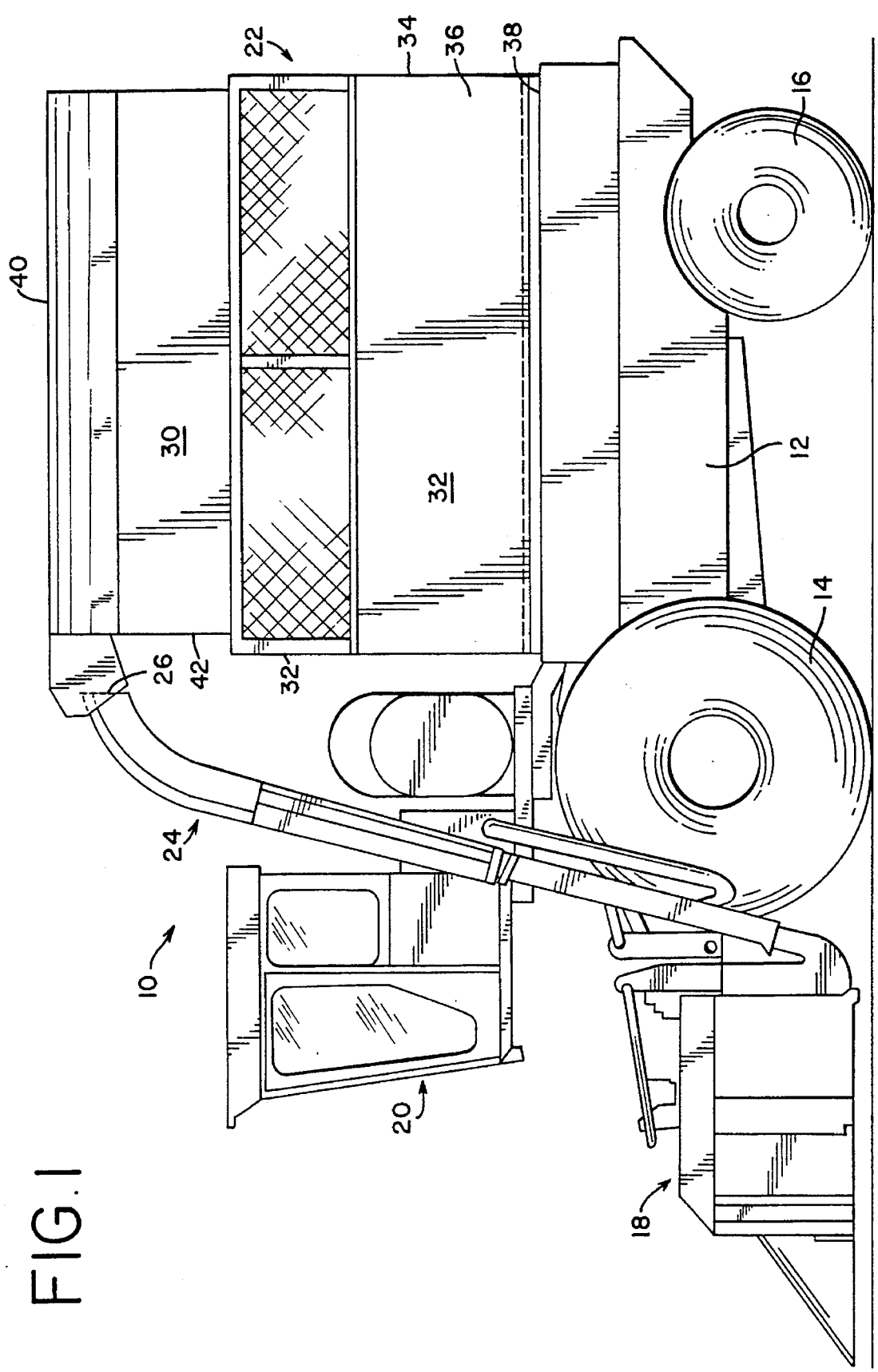
FIG. 1 is a schematic side elevational view of a cotton harvester with a basket assembly embodying a cotton compacting structure according to the present invention.

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Referring now to the drawings, wherein like reference numerals indicate like parts throughout the several views, in FIG. 1 there is generally indicated by reference numeral 10 a cotton harvester which is preferably of the type sold by Case Corporation of Racine, Wis. under model number 2155. The cotton harvester 10 has a fore-and-aft extending frame 12 supported for movement over the ground by a pair of front drive wheels 14 and a pair of rear steerable wheels 16. A plurality of transversely spaced harvesting row units 18 are supported at a forward end of the frame 12. A cab region or operator station 20 is supported on the frame 12 rearwardly and above the row units 18. A relatively large basket assembly 22 is also supported on the frame 12 rearwardly of the cab region 20. An air duct system, indicated generally by reference numeral 24, extends from the row units to an upper forward portion of the basket assembly 22. As is conventional, the air duct structure 24 defines an outlet opening 26 at an upper end thereof through which harvested cotton materials are blown and directed into the basket assembly 22 in a predetermined direction.

In the illustrated form of the invention, the basket assembly 22 comprises upper and lower basket portions 30 and 32, respectively. The upper basket portion is telescopically received within the lower basket portion 32 and is movable between a lowered transport or shipping configuration and a raised or field working position under the influence of suitable hydraulic cylinders (not shown). As is conventional, the basket assembly 22 can be elevated relative to the frame 12 to facilitate emptying or dumping of the cotton materials from the basket.

It should be appreciated, however, that the exact structure of the basket assembly 22 is not essential to the present invention and whereas the present invention is equally applicable to and readily suited for other forms of basket assemblies which do not include upper and lower basket portions. Suffice it to say, the basket assembly 22 includes a front wall 32, a rear wall 34 and opposed sidewalls 36 which extend upwardly from a bottom floor structure 38. A top wall or lid 40 is connected to the walls 32, 34 and 36 at their upper ends to add strength and rigidity to the basket assembly 22 and to define a walled enclosure 42.

Figure 2:
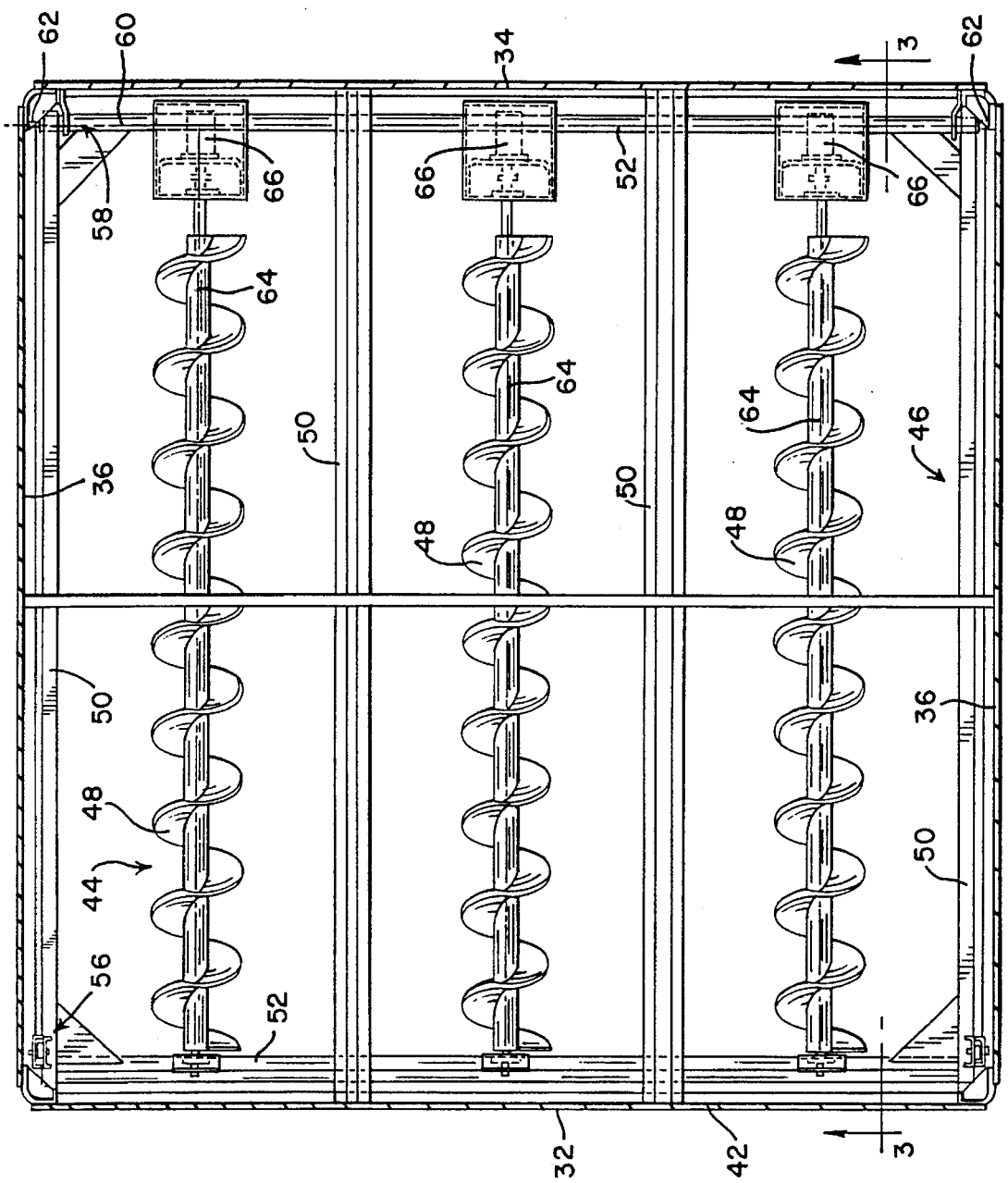
FIG. 2 is an enlarged longitudinal sectional view of an upper end of the basket assembly having the compacting structure of the present invention mounted therein.
Figure 3:
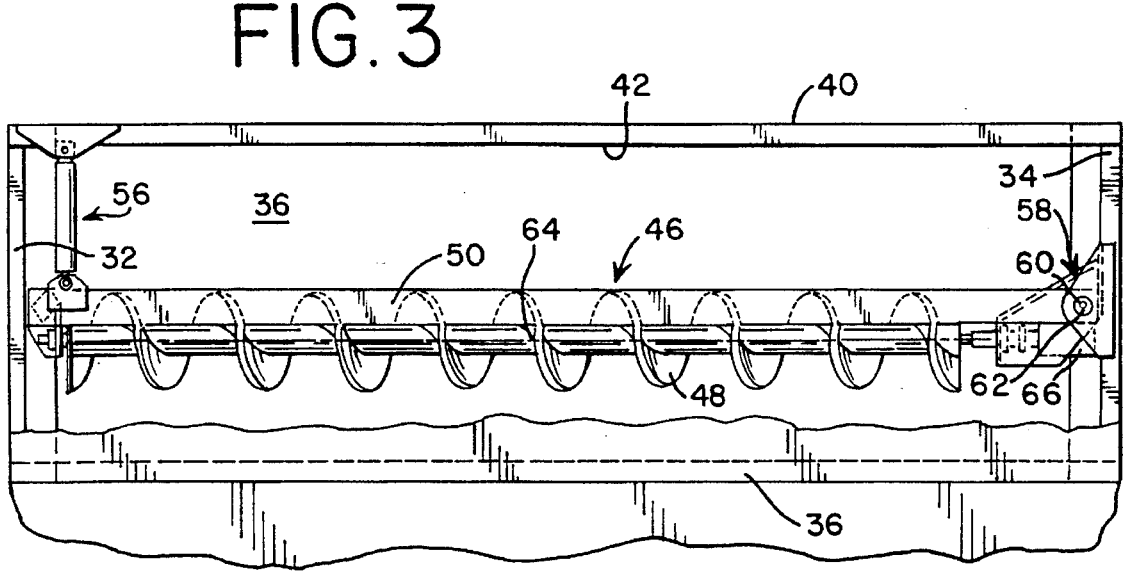
FIG. 3 is a sectional view taken along line 3—3 of FIG. 2.

To increase capacity of the basket assembly 22 without increasing basket size, a cotton compacting structure, generally indicated in FIGS. 2 and 3 by reference number 44, is mounted within the basket assembly 22. The compacting structure 44 includes a rigid cotton compacting frame assembly 46 and one or more rotatable members 48 that are mounted on and movable with the frame assembly 46.

The frame assembly 46 is movable within the enclosure 42 defined by the walls 32, 34 and 36 of the basket assembly 22. In the illustrated embodiment, the frame assembly 46 has a generally rectangular configuration that is concentric with the enclosed opening 42 of the basket assembly 22 and is comprised of a plurality of rigid transversely spaced and elongated frame members 50 that are rigidly joined to each other adjacent their ends by rigid transverse frame members 52. Notably, the frame members 50 of the frame assembly 46 are arranged parallel to the rotational axis and on opposite sides of each rotatable member 48. To lessen the weight of the frame assembly 46, the frame members 50 and 52 preferably have a hollow configuration along their lengths.

The frame assembly 46 is vertically movable on-the-go between a retracted position and an extended position under the influence of a driver 56. As shown in FIG. 3, in its retracted position, the frame assembly 46 is ganged generally parallel and proximate to the lid or top wall 40 of the basket assembly 22. In its extended position, the frame assembly 46 is moved toward the floor structure 38 (FIG. 1) of the basket assembly 22. Driver 56 preferably includes a linearly distendable double acting hydraulic cylinder 58 that has sufficient stroke to move the frame assembly 46 between extended and retracted positions.

In a preferred form of the invention, the compacting structure 44 further includes structure 58 for mounting the frame assembly 46 for generally pivotal movement between its retracted and extended positions within the enclosure defined by the basket assembly 42. As shown in FIG. 2, structure 58 preferably mounts the frame assembly 46 for pivotal movement about a generally horizontal transverse axis 60 arranged toward a rear end of the basket assembly 42. In a most preferred form, structure 58 includes a pair of axially aligned stub shafts 62 about which the frame assembly 46 pivots between retracted and extended positions. As shown in FIGS. 2 and 3, the driver 56 is preferably connected at the end of the frame assembly 46 opposite from the pivot axis 60.

Each rotatable member 48 of the compacting structure 44 is preferably mounted for rotation about a fore-and-aft extending axis 64 that extends generally parallel to the direction that the cotton materials are blown into the basket assembly 22 from the duct structure 24. As shown, each rotatable member 48 has an auger-like configuration for imparting movement to the cotton materials in the basket. In the preferred form of the invention, each auger or member 48 is driven by a hydraulic motor 66 that is mounted on and for movement with the frame assembly 46. In the illustrated embodiment of the invention, the hydraulic motors 66 for driving the augers 48 are connected in series relative to each other and are preferably operated independently of the driver 56 that vertically moves the frame assembly 46.

Figure 4:
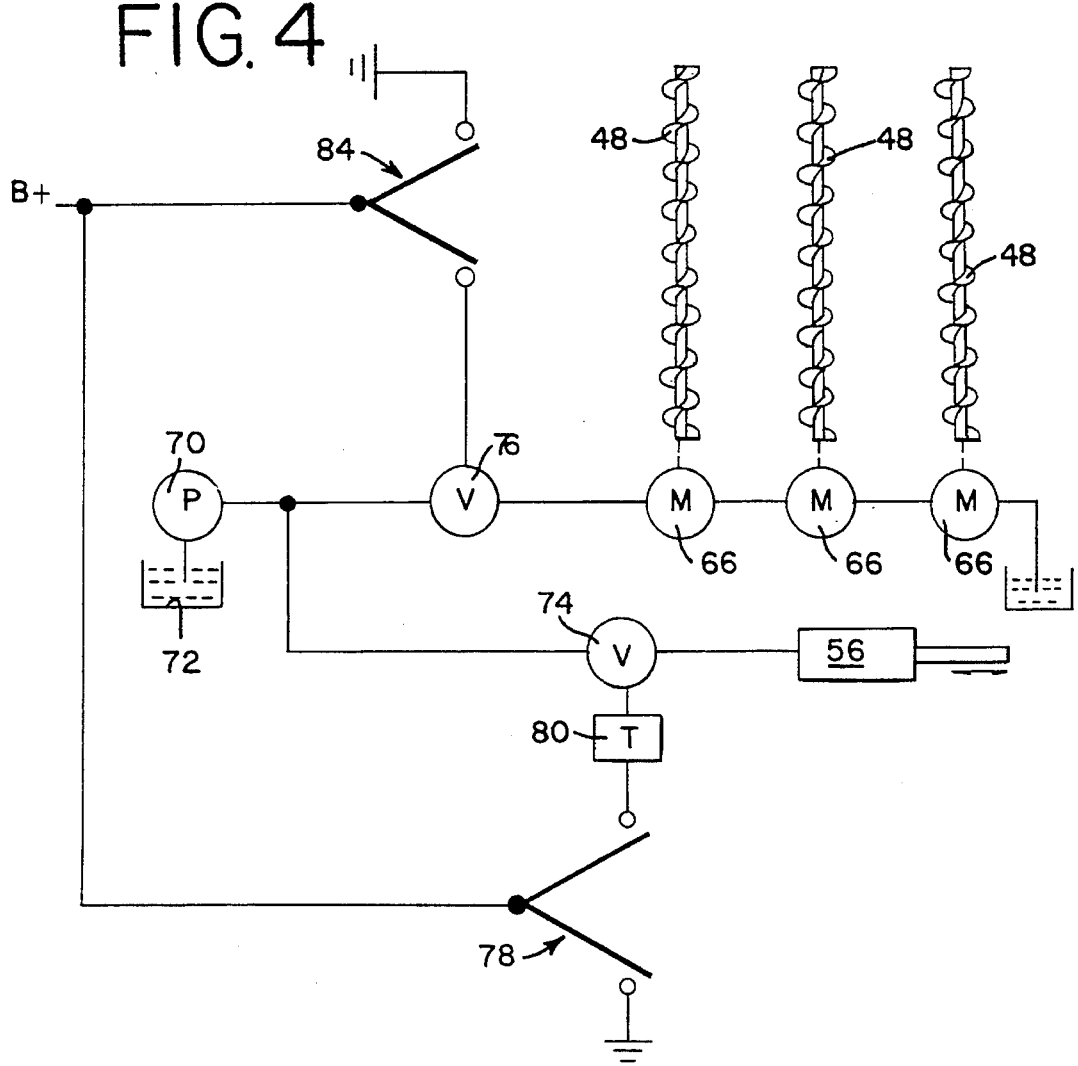
FIG. 4 is a schematic diagram of a system for controlling operation of the compacting structure of the present invention.

Referring now to FIG. 4, one form of circuitry for operating the compacting structure 44 including the rotatable augers 48 and the driver 56 for vertically moving the frame assembly 46 will be discussed in detail. A source of hydraulic fluid under pressure 70 and a reservoir 72 are typically located on the frame 12 of the cotton harvester 10. The source of pressurized fluid 70 is interconnected, through suitable conduits, to the driver 56 through a valve 74 and to the hydraulic motors 66 through a valve 76.

Operation of valve 74 and thereby the operation of driver 56 is preferably controlled by a manually operated switch 78 that may be arranged in the cab region 20 (FIG. 1) of the harvester. Switch 78 is connected to a suitable power source B+ such is the battery on the harvester. In the illustrated embodiment of the invention, a conventional cyclic timer 80 is operably disposed between switch 78 and valve 74. The purpose of timer 80 is to control the number of cyclic oscillations of the frame assembly 46 between retracted and extended position as well as the time duration of each operating cycle. In this regard, timer 80 may be adjusted as desired by the operator.

Operation of valve 76 and thereby rotation of the augers 48 is controlled by a manually operated switch 84 also arranged in the cab region 20 (FIG. 1) of the harvester 10. Switch 80 is likewise connected to the suitable power source B+ such as the battery on the harvester.

As cotton materials are harvested by the row units 18, the air duct system 24 pneumatically directs the hap, tested materials to the front upper portion of the basket assembly 22 and blows the harvested materials into the basket assembly in a predetermined direction. During a harvesting operation, the compacting structure 44 of the present invention is in a retracted position whereat the frame assembly 46 and rotatable members 48 are parallel to and closely adjacent the top wall or lid 40 of the basket assembly. During a harvesting operation, the augers 48 of the compacting structure 44 are normally conditioned to rotate about their respective axes when the frame assembly 46 is in a retracted position thereby imparting movement to the cotton materials in a direction extending parallel to the predetermined direction and toward the rear wall 34 of the basket assembly.

As the harvester 10 is driven across the field, cotton materials fill the basket assembly 22. Eventually, the harvested cotton materials will accumulate near the top wall or lid 40 of the basket assembly 22. It will be appreciated, of course, that it is beneficial to maintain a substantially unobstructed path for the cotton materials that are introduced to the basket assembly. To effect such ends, and intermittently during the harvesting operation, the driver 56 vertically moves the frame assembly 46 along with the augers 48 from a retracted position toward an extended position.

As the frame assembly 46 and rotatable members 48 move vertically, the cotton materials therebeneath are compacted toward the floor structure 38. Since the frame assembly 46 preferably pivots about axis 60 arranged toward the rear of the basket assembly, the vertical downward movement of the frame assembly 46 and rotatable members 48 will also impart a compacting movement of the cotton materials toward the rear wall 34 of the basket assembly 22. As the compacting structure 44 is moved toward its extended position, the rotatable members 48 preferably continue to rotate and tend to move the cotton materials engaged thereby toward the rear wall 34 of the basket assembly. In the illustrated embodiment of the invention, the cyclic timer 80 controls the number of vertical movements of the frame assembly 46 and compacting augers 48 in an operating cycle of the compacting structure 44 and thereby selectively controls the amount or degree of compaction of the harvested cotton materials in the basket assembly 22.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A mobile cotton harvester having a cotton basket, cotton conveying duct structure including an outlet for blowing cotton in a preselected direction into said basket and a cotton compacting assembly comprising:

a rigid cotton compacting frame mounted for movement in said basket; and at least one rotatable member mounted on and movable with said frame, said member being configured to impart movement to the cotton received in said basket away from said outlet upon rotation of said member.

2. The cotton harvester according to claim 1 further including structure for mounting the frame for pivotal movement about a fixed generally horizontal axis.

3. The cotton harvester according to claim 1 wherein said cotton compacting assembly further includes a driver for vertically reciprocating the frame on-the-go to push the cotton materials toward a floor of the basket.

4. The cotton harvester according to claim 1 wherein a driver is provided to rotate each rotatable member independent of the movements of the frame.

5. The cotton harvester according to claim 4 wherein the axis rotation of said member is generally parallel to the direction of the blown harvested cotton.

6. The cotton harvester according to claim 1 wherein said frame includes a plurality of rigidly interconnected frame member.

7. A cotton harvester having a cotton basket adapted to receive and hold harvested cotton materials, and a cotton compacting assembly comprising:

a rigid cotton compacting frame mounted for movement in said basket; and at least one rotatable member carried on and movable with the frame for imparting movement to the cotton materials received in said basket.

8. The cotton harvester according to claim 7 wherein said cotton compacting assembly further includes a selectively operated driver that vertically moves the frame on-the-go to compact cotton materials in said basket.

9. The cotton harvester according to claim 7 wherein the frame of said compacting assembly includes an elongated structural frame member arranged on opposite sides of each rotatable member.

10. The cotton harvester according to claim 7 wherein said frame is mounted toward one end to said basket for pivotal movement about a generally horizontal axis.

11. The cotton harvester according to claim 7 wherein each rotatable member is separately driver by a motor that operates independently of the vertical movement of the frame.

12. The cotton harvester according to claim 11 wherein each rotatable member is driven by said motor concurrently with movements of said frame to forcibly propel cotton materials in a predetermined direction within said basket.

13. A cotton harvester having a mobile fore-and-aft extending frame, duct structure for blowing harvested cotton materials into a cotton basket adapted to receive and hold the harvested cotton materials, said basket including a floor, a top wail, with opposed side walls and front and back walls that extend upwardly from the floor and are rigidly joined to the top wall, and a cotton compacting assembly for compacting the harvested cotton materials within said basket, said compacting assembly comprising:

a frame assembly including a plurality of fore-and-aft rigid frame members that are rigidly connected to each other by a series of transverse members, said frame assembly being mounted within said basket for vertical movement between a retracted position and an extended position; and a plurality of rotatable augers carried on and movable with the frame assembly for imparting movement to the cotton materials received in said basket.

14. The cotton harvester according to claim 13 wherein said compacting assembly further includes structure for mounting said frame assembly for pivotal movement about a generally horizontal fixed axis.

15. The cotton harvester according to claim 13 wherein said frame assembly is closely adjacent said top wall in a retracted position and moves toward said bottom in an extended position.

16. The cotton harvester according to claim 15 wherein said compacting assembly further includes a driver for moving said frame assembly away from said retracted position toward said extended position.

17. The cotton harvester according to claim 13 wherein each auger is rotatably driven under the influence of a hydraulic motor that operates independently of vertical movements of the frame assembly.

18. The cotton harvester according to claim 13 wherein each auger rotates about an axis that extends generally parallel to the direction of the blown harvested cotton.

19. A cotton receiving receptacle comprising:

a walled enclosure into which harvested cotton is directed, said walled enclosure being defined by a top wall, a bottom floor, and a series of upstruck rigid side walls that extend upwardly from the floor and are joined to the top wall; and cotton compacting structure arranged within said walled enclosure for compacting the cotton received within said enclosure, said compacting structure comprising a rigid frame mounted for reciprocating movements in said enclosure, and one or more rotatably driven augers carried on and movable with said frame.

20. The cotton receiving receptacle according to claim 19 wherein said rigid frame is normally maintained in a retracted position adjacent and generally parallel to said top wall of the walled enclosure and is movable to an extended position.

21. The cotton receiving receptacle according to claim 20 wherein a linearly distendable hydraulic driver moves said frame assembly between retracted and extended position.

22. The cotton receptacle according to claim 19 wherein said walled enclosure includes a lower basket portion and an upper basket portion, with said upper basket portion being telescopically movable relative to the lowered basket portion.

23. The cotton receiving receptacle according to claim 22 wherein said frame is mounted for movement with said upper basket portion.

24. The cotton receptacle according to claim 19 wherein said frame is mounted to said walled enclosure for pivotal movement between retracted and extended positions.

25. The cotton receptacle according to claim 19 wherein each auger is rotatably driven by a motor independent of the vertical movement of the frame.

26. The cotton receptacle according to claim 19 wherein a first operator switch controls vertical movements of the rigid frame and a second operator switch controls rotation of said augers.

27. A method of filling a cotton basket on a cotton harvester, including the steps of:

blowing harvested cotton materials in a preselected direction into the basket;

rotating a series of augers to move the cotton in generally the same direction as said preselected direction;

moving a cotton compacting frame assembly on which said augers are mounted between a retracted position and an extended position to compact the harvested cotton materials in the basket.

28. The method according to claim 27 further including the step of mounting the frame assembly for pivotal movement about a fixed generally horizontal axis.

29. The method according to claim 27 wherein the step of rotating the augers is effected independently from the step of moving the frame assembly.

* * * * *